US009738542B2

(12) United States Patent
Pierau et al.

(10) Patent No.: US 9,738,542 B2
(45) Date of Patent: Aug. 22, 2017

(54) METHOD FOR THE FURTHER PROCESSING OF IRON SULFATE HEPTAHYDRATE

(71) Applicant: Kronos International, Inc., Leverkusen (DE)

(72) Inventors: Thomas Pierau, Leverkusen (DE); Mitja Medved, Leverkusen (DE)

(73) Assignee: Kronos International, Inc., Leverkusen (DE)

( * ) Notice: Subject to any disclaimer, the term of this patent is extended or adjusted under 35 U.S.C. 154(b) by 5 days.

(21) Appl. No.: 14/958,299

(22) Filed: Dec. 3, 2015

(65) Prior Publication Data

US 2016/0159661 A1    Jun. 9, 2016

(30) Foreign Application Priority Data

Dec. 9, 2014 (DE) .................. 10 2014 018 131
Mar. 6, 2015 (EP) .................. 15000654
Jun. 22, 2015 (DE) .................. 10 2015 007 890

(51) Int. Cl.
*C01G 49/14* (2006.01)
*C01G 49/02* (2006.01)
*C01G 49/06* (2006.01)

(52) U.S. Cl.
CPC ............ *C01G 49/14* (2013.01); *C01G 49/02* (2013.01); *C01G 49/06* (2013.01)

(58) Field of Classification Search
None
See application file for complete search history.

(56) References Cited

U.S. PATENT DOCUMENTS

| 2,143,805 | A | * | 1/1939 | Smith | C01G 49/14 423/558 |
| 2,668,130 | A | * | 2/1954 | Martin | C23G 1/36 134/13 |
| 3,340,015 | A | * | 9/1967 | Karsay | C01B 17/901 134/10 |
| 5,788,740 | A | * | 8/1998 | Chase | C22B 7/007 423/434 |
| 2010/0163486 | A1 | * | 7/2010 | Suty | C02F 1/5245 201/638 |

FOREIGN PATENT DOCUMENTS

| DE | 1546076 | * | 2/1970 |
| FR | 1237923 | * | 8/1960 |
| GB | 800410 | * | 8/1958 |
| GB | 1093162 |   | 11/1967 |

* cited by examiner

*Primary Examiner* — Melvin C Mayes
*Assistant Examiner* — Sheng H Davis
(74) *Attorney, Agent, or Firm* — Locke Lord LLP

(57) ABSTRACT

The invention relates to a method for the further processing of iron sulfate heptahydrate into iron sulfate monohydrate. An aqueous solution or suspension of iron sulfate heptahydrate is formed and heated in a pressure vessel to a temperature above its boiling temperature at atmospheric pressure and where solid iron sulfate monohydrate and a solution are formed. The solid iron sulfate monohydrate is separated from the solution and fed into a pressure vessel at a temperature above the boiling temperature of the solution at the pressure in the pressure vessel, which is lower than the pressure during separation.

29 Claims, 3 Drawing Sheets

METHOD FOR THE FURTHER PROCESSING OF IRON SULFATE HEPTAHYDRATE

RELATED APPLICATIONS

This application claims the benefit of Patent App. No. DE 102014018131.6 filed Dec. 9, 2014; Patent App. No. EP 15000654.2 filed Mar. 6, 2015; and Patent App. No. DE 102015007890.9 filed Jun. 22, 2015.

BACKGROUND

Field of the Invention

The invention relates to a method for processing iron sulfate heptahydrate into iron sulfate monohydrate, and optionally into iron oxides and/or iron hydroxides.

Technological Background of the Invention

Large quantities of iron sulfate are obtained during production of titanium dioxide by the sulfate process, and also when pickling or etching ferrous metals. Iron sulfate is used in various sectors, e.g. as an additive in the animal feed and fertilizer industry, for water treatment in sewage treatment plants, as an agent for reducing chromate in cement, or as a raw material for iron oxide production.

Iron sulfate from technical processes is generally present in one of three states of hydration: heptahydrate, tetrahydrate and monohydrate. During the aforementioned production of titanium dioxide by the sulfate process, and when pickling or etching ferrous metals, the iron sulfate is primarily obtained in the form of heptahydrate. Iron sulfate heptahydrate has the highest water content of the three states of hydration and is difficult to store at temperatures in excess of 25° C., because it then melts in its own water of crystallization. Iron sulfate heptahydrate also has the lowest iron content of all hydrate forms, this resulting in a number of disadvantages in the target applications.

Consequently, various methods have been developed for further processing iron sulfate heptahydrate into lower states of hydration.

On an industrial scale, the heptahydrate is today predominantly converted into tetrahydrate or monohydrate by various kinds of thermal drying. The disadvantages of these methods is, however, their relatively high energy consumption, corresponding to at least the heat of evaporation of the water of crystallization to be removed.

Alternatively, a melting method in accordance with DE 1 230 409 can be used, where the iron sulfate heptahydrate is heated to up to 95° C., such that it melts in its water of crystallization, and iron sulfate monohydrate is precipitated and separated off. This method is more favorable than thermal drying in terms of energy, but roughly 25% by weight of the iron sulfate does not precipitate and remains in the mother liquor owing to the solubility behavior in the iron sulfate/water system.

DE 1 546 076 discloses a method for regenerating a spent etching solution, where iron sulfate monohydrate is added to the spent etching solution, whereupon iron sulfate heptahydrate is formed that is then separated off in solid form. The heptahydrate obtained can subsequently be heated to between 100° C. and 200° C., in order to again form iron sulfate monohydrate, which is returned to the process. DE 1 546 076 does not deal with adjusting the residual moisture content of the iron sulfate monohydrate produced.

There is thus a need for a method for the further processing of iron sulfate heptahydrate that at least overcomes the disadvantages of the prior art.

BRIEF DESCRIPTION OF THE INVENTION

The object of the invention is to provide a method for processing iron sulfate heptahydrate into iron sulfate monohydrate, and possibly further iron compounds, that is energy-efficient and characterized by high-level recovery of iron compounds, as well as enabling control of the residual moisture content and iron(III) content in the iron sulfate monohydrate product obtained.

The object is solved by a method for the further processing of iron sulfate heptahydrate, characterized by the following process steps:

a) Formation of an aqueous solution or suspension of iron sulfate heptahydrate in a tank (Mixture I), b) Feeding of Mixture I into a first pressure vessel and heating of Mixture I to a temperature T1 that is above the boiling temperature of Mixture I at atmospheric pressure, where a pressure P1 builds up and where solid iron sulfate monohydrate and a Solution II are formed, c) Separation of the solid iron sulfate monohydrate from Solution II, d) Feeding of the separated solid iron sulfate monohydrate with adhering Solution II into a further pressure vessel with a pressure P3, where P3 is lower than the pressure prevailing in Step c), and where the temperature of the incoming solid with adhering Solution II is above the boiling temperature of Solution II at pressure P3, and where a temperature T3, corresponding to pressure P3, builds up in the further pressure vessel.

Other advantageous embodiments of the invention are indicated in the sub-claims.

BRIEF DESCRIPTION OF THE FIGURES

For a more complete understanding of the present invention and for further advantages thereof, reference is now made to the following description taken in conjunction with the accompanying drawings in which.

DESCRIPTION OF THE PREFERRED EMBODIMENTS

The present invention can be better understood by the following discussion of the manufacture and use of certain preferred embodiments. All data disclosed below regarding temperature, pressure, concentration in % by weight, etc. are to be interpreted as also including all values lying in the range of the respective measuring accuracy known to the person skilled in the art. Unless otherwise stated, technical grades of the various materials were used in the preferred embodiments.

According to the present invention, aqueous iron sulfate solutions and/or iron sulfate suspensions are heated in a pressure vessel, beyond the boiling temperature occurring at atmospheric pressure. In this context, the solubility of iron sulfate declines with increasing temperature, and iron sulfate monohydrate is precipitated. The increasing temperature is generally known to be accompanied by an increase in pressure.

Figure 1:
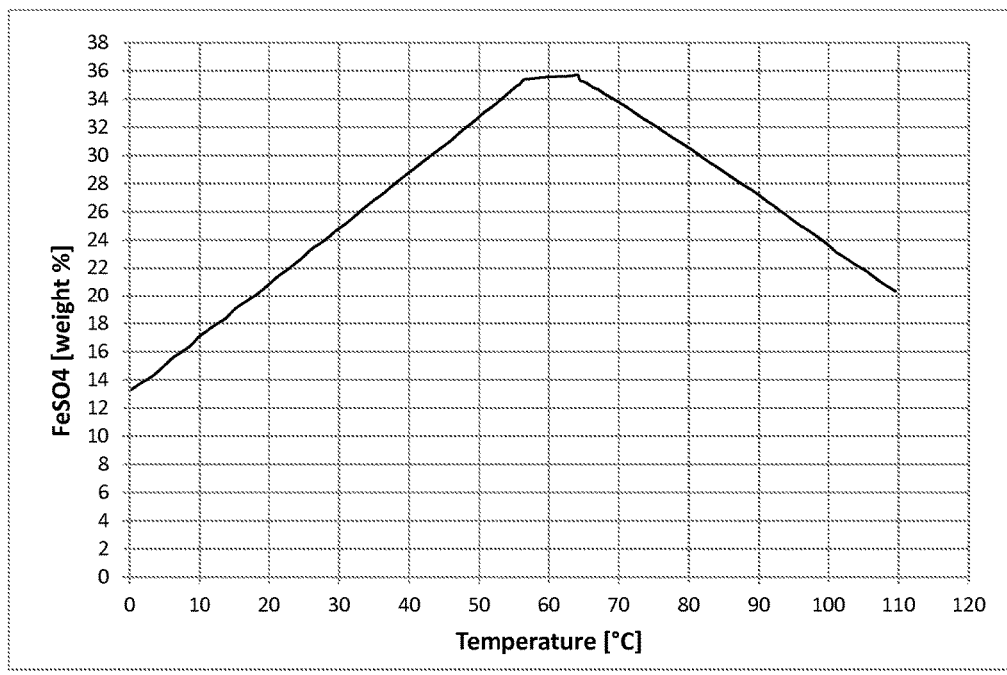
FIG. 1 is a solubility curve of iron sulfate in water.
Figure 2:
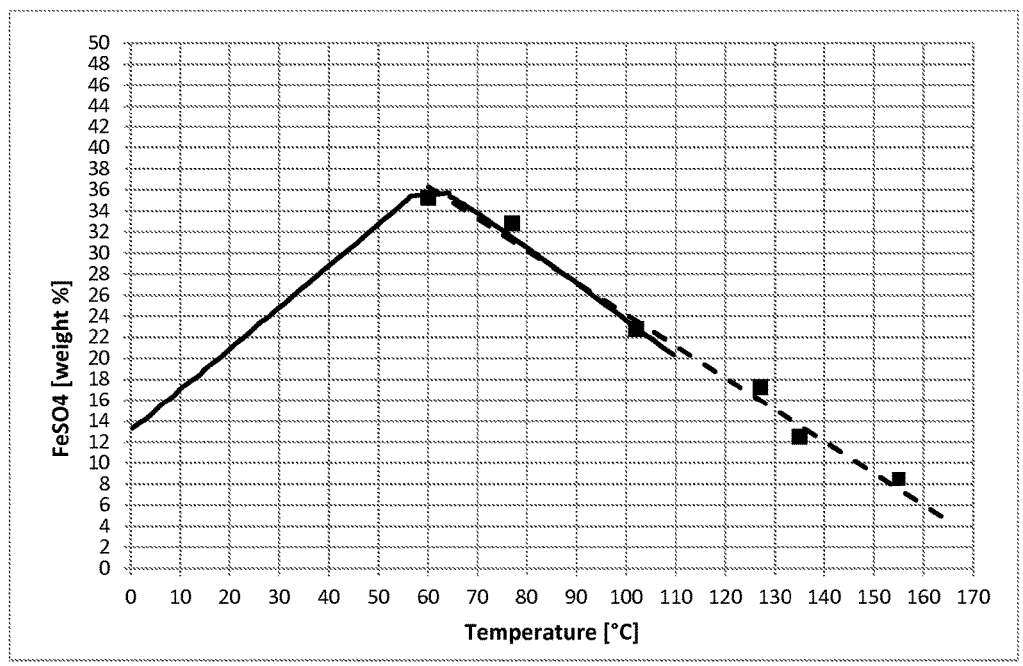
FIG. 2 is a solubility curve of iron sulfate in water according to FIG. 1, expanded to include further measuring points up to roughly 160° C.

As seen in FIG. 1, the solubility of iron sulfate in water declines above a temperature of roughly 60° C. (Gmelins Handbuch der anorganischen Chemie, System—Nr. 59 "Eisen", Teil B—Lieferung 2, 8th edition 1930, p. 401) In the framework of the invention, investigations were carried out regarding the behavior of the solubility of iron sulfate in water at temperatures of above 110° C., up to roughly 160° C., and at corresponding pressures. FIG. 2 shows the corresponding analytical values (dots) and the course of the solubility curve determined therefrom (broken line). FIG. 2 reveals that, at a temperature of above roughly 135° C., the solubility of iron sulfate becomes lower than the solubility at a temperature of 5° C. Five degrees centigrade is considered the lower limit of the practically realizable cooling temperature in technical systems. However, customarily only minimum temperatures of approx. 15° C. are achieved with a justifiable energy input with the help of evaporative cooling systems. As shown in FIG. 1, at 15° C., the solubility of iron sulfate is roughly 18% by weight, meaning that 18% by weight iron sulfate remain in the solution (mother liquor).

In a preferred embodiment of the invention, the solution is heated to above 110° C., particularly to between 135° C. and 300° C., and more particularly to between 140° C. and 160° C. The temperature of 160° C., for example, is reached at a pressure of roughly 6 bar, which is customarily available as standard in the form of steam in chemical plants. The investigations in the framework of the present invention revealed that the solubility of iron sulfate is roughly 10 to 12% by weight at 140° C., and roughly 4 to 6% by weight at 160° C., and thus significantly lower than in the known methods based on a melting process.

Figure 3:
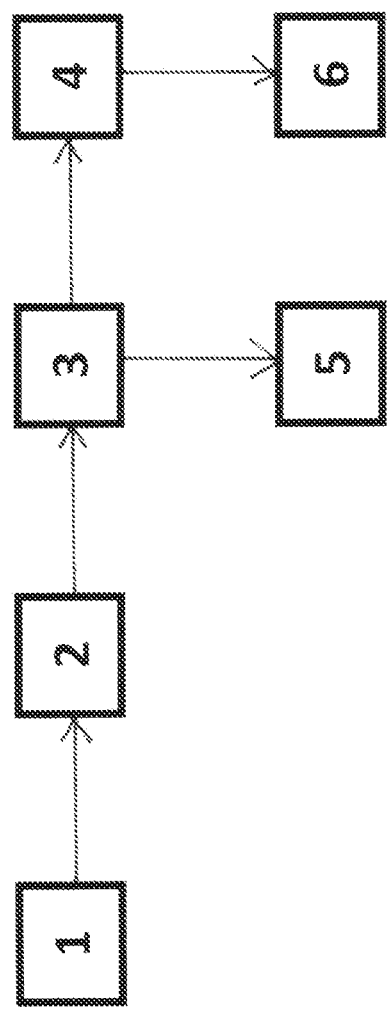
FIG. 3 is a schematic flow chart of an embodiment of the method according to the invention.

FIG. 3 shows a schematic flow chart of an embodiment of the method according to the invention.

In a first step (Step a), an aqueous solution and/or a suspension of iron sulfate heptahydrate (Mixture I) is prepared in a tank (1). The iron sulfate solution/suspension is saturated or, preferably, supersaturated.

Mixture I is fed into a first, heatable pressure vessel (autoclave) (2) (Step b), where Mixture I is heated to a temperature T1 that is above the boiling temperature at atmospheric pressure, preferably to above 110° C., particularly to between 135° C. and 300° C., and particularly preferably to between 140° C. and 160° C. Owing to the pressure-resistant design, a positive pressure P1, corresponding to the respective temperature T1, builds up. Iron sulfate monohydrate is precipitated in accordance with the declining solubility of iron sulfate in water at high temperatures.

This is followed by separation (3) of the iron sulfate monohydrate (Step c), leaving a solution low in iron sulfate, known as the mother liquor (Solution II) (5).

Various kinds of apparatus familiar to the person skilled in the art can be used to separate off the precipitated iron sulfate monohydrate, e.g. a cyclone or a filter, preferably a pressure filter or vacuum drum filter, or a centrifugal decanter, or a candle filter, where all filtration apparatuses can be of pressure-resistant design. Owing to the nature of the process, adhering mother liquor (Solution II) remains on the separated, solid iron sulfate monohydrate in the form of interstitial water and residual moisture.

In one embodiment of the invention, separation takes place at a temperature T2 and a pressure P2, where T2 corresponds to temperature T1, and P2 to pressure P1, such that partial redissolution of the separated iron sulfate monohydrate is avoided as far as possible.

In an alternative embodiment of the invention, separation takes place at a temperature T2 and a pressure P2, where T2 is greater than T1, and P2 greater than P1. The higher temperature T2 can be achieved by introducing superheated steam and/or a hot gas into the filtration apparatus, for example. The superheated steam and/or the hot gas is or are preferably passed through the moist filter cake. Temperature T2 and pressure P2 thereupon prevail in the iron sulfate monohydrate filter cake.

The residual moisture content of the iron sulfate monohydrate product can be controlled in this way. The passing of the superheated steam and/or the hot gas through the moist filter cake, and the associated temperature rise in the filter cake, lead to evaporation of the mother liquor (Solution II) adhering to the solid iron sulfate monohydrate in the form of interstitial water and residual moisture. If the adhering mother liquor is concentrated by evaporation and/or expelled, further iron sulfate monohydrate simultaneously crystallizes out as a result of the temperature increase. This ultimately achieves a higher yield of solid iron sulfate monohydrate and a specific residual moisture content in the filter cake obtained in this way.

During introduction of the superheated steam and/or the hot gas, small, single crystals are additionally formed on the surface of the previously formed, coarsely crystalline, solid iron sulfate monohydrate due to the further crystallization of the iron sulfate monohydrate dissolved in the adhering mother liquor (Solution II). These crystals contribute to agglutination of the coarsely crystalline, solid iron sulfate monohydrate, this leading to pre-agglomeration of the solid, which is advantageous for further processing of the product.

It is advantageous that, owing to the relatively brief action of the superheated steam and/or the hot gas on the solid, only the vapor or gas space is heated in addition to the solid itself, any liquid and/or suspension (mother liquor) present in the apparatus not also being heated, this leading to additional energy savings.

The superheated steam and/or the hot gas is or are preferably introduced with a temperature above the boiling temperature of the mother liquor at the prevailing pressure. As a rule, superheating of up to 5° C. above temperature T1 suffices to achieve an advantageous effect for controlling the residual moisture content. From the energetic point of view, superheating of up to 100° C., preferably up to 60° C., and particularly preferably up to 20° C., above temperature T1 has proven to be advantageous.

In a special embodiment of the invention, the separating device (3) is integrated in the first pressure vessel (2). For example, the first pressure vessel (2) can in this case be a heatable drum filter of pressure-resistant design. The person skilled in the art is familiar with corresponding apparatus.

In this embodiment, too, the residual moisture content of the iron sulfate monohydrate product can be controlled in that, during separation (3) following completion of the formation of the solid iron sulfate monohydrate in Mixture I (Step b), superheated steam and/or a hot gas is or are introduced into the apparatus and brought into contact with the solid, such that, compared to T1 and P1, a higher temperature T2 and a higher corresponding pressure P2 prevail in the solid.

For further adjustment of the residual moisture content, the separated, moist solid iron sulfate monohydrate is fed via a pressure lock into a further pressure vessel (4) (Step d), in which a pressure P3 prevails that is lower than the pressure prevailing in Step c). The temperature of the solid iron sulfate monohydrate introduced into the further pressure vessel (4) is above the corresponding boiling temperature of the mother liquor (Solution II) at the prevailing pressure P3. This results in flash evaporation of the water from the mother liquor adhering to the solid, and further iron sulfate monohydrate crystallizes out. Finally, the iron sulfate monohydrate product is discharged (6). The residual moisture content of the iron sulfate monohydrate product (6) obtained in this way can be controlled by controlling the pressure reduction to P3 and the resultant, corresponding temperature T3 in the further pressure vessel (4).

In a further embodiment of the invention, additional control of the residual moisture content of the iron sulfate monohydrate is also possible in that the further pressure vessel (4) is equipped with direct or indirect heating, meaning that temperature T3 can be kept constant, or a higher temperature can be set by heating. In this way, further adhering mother liquor can be evaporated more efficiently, and an even lower residual moisture content of the iron sulfate monohydrate (6) achieved. In accordance with the solubility behavior, further iron sulfate monohydrate likewise crystallizes out from the mother liquor still adhering in this context, as a result of which the yield once again increases, and the pre-agglomeration described above takes place.

The iron sulfate monohydrate product (6), obtained as described above, preferably displays a residual moisture content of max. 20% by weight, particularly max. 10% by weight, and particularly preferably max. 5% by weight, referred to the total mass of the product. The moisture content is determined as free water by drying at 105° C. until constancy of weight.

Optionally, the iron sulfate monohydrate product (6) obtained can subsequently be agglomerated by customary methods, using known binders, such as water or iron sulfate solution and/or organic binders, e.g. based on saccharides or carboxymethylcellulose, where appropriate.

Alternatively, the method according to the invention is operated in such a way that the iron sulfate monohydrate product obtained displays a minimized trivalent iron content. Trivalent iron can be formed in the course of the process, if oxidizing conditions prevail. Moreover, the iron sulfate monohydrate product can contain trivalent iron if the starting material, iron sulfate heptahydrate, already contains trivalent iron. Trivalent iron can, for example, be formed during the production of Mixture I (1), during the crystallization of iron sulfate monohydrate in the first pressure vessel (2), during separation of the iron sulfate monohydrate from the mother liquor (3), or during treatment in the further pressure vessel (4).

Various measures—implemented singly or in combination—are possible for minimizing the trivalent iron content in the iron sulfate monohydrate product:

Addition of metallic iron or other suitable reducing agents during the production of Mixture I (1) and/or during the formation of solid iron sulfate monohydrate (2), Addition of acids (e.g. sulfuric acid) or other substances to inhibit oxidation during the production of Mixture I (1) and/or during the formation of solid iron sulfate monohydrate (2), Introduction of non-oxidizing gas, such as nitrogen, or of vapor, such as steam, during the production of Mixture I (1), the formation of solid iron sulfate monohydrate (2), separation (3) or treatment in the further pressure vessel (4).

For example, Mixture I, which is produced in the first step (Step a)), contains sulfuric acid. The sulfuric acid concentration in Mixture I can be up to 60% by weight sulfuric acid. For the technical embodiment, the sulfuric acid concentration in Mixture I is advantageously in the range of up to max. 35% by weight, preferably up to 20% by weight, particularly up to 10% by weight, and particularly preferably between 0.1 and 4.0% by weight. As the solubility of iron sulfate declines with increasing sulfuric acid concentrations (see FIG. 1), this particular embodiment results, on the one hand, in a higher iron sulfate monohydrate yield, while, on the other hand, a smaller proportion of the dissolved iron remains in the mother liquor (Solution II). Furthermore, the presence of sulfuric acid partly inhibits, or completely prevents, undesirable oxidation of the bivalent iron, both during the production of Mixture I (Step a)) and during the formation of solid iron sulfate monohydrate (Step b)) and during separation of the iron sulfate monohydrate.

Furthermore, oxidation-preventing additives, such as sodium sulfite or, for example, sulfurous acid or sulfuric acid, sodium dithionite, sodium thiosulfate, sodium hydroxymethanesulfinate and, for example, ascorbic acid or sorbic acid, can additionally be added to Mixture I. As a rule, the quantity of additive is below 5% by weight, preferably below 3% by weight, and particularly preferably below 1% by weight, referred to the total mass of Mixture I.

The iron sulfate monohydrate product preferably displays a trivalent iron content of max. 10% by weight, particularly max. 3% by weight, and particularly preferably under 1% by weight, referred to total iron.

In a special embodiment, Solution II (5) can at least partly be returned to the tank (1). In a developed embodiment of the invention, the iron content remaining in Solution II (5) is likewise largely recovered. To this end, Solution II (5) that was not returned to the tank (1) is fed into an oxidation reactor. In a special embodiment, the oxidation reactor is of pressure-resistant design and operated with air or oxygen. Beyond this, additives can be added to assist oxidation, such as salts (e.g. NaCl) and/or alkaline substances (e.g. NaOH) and/or oxidation catalysts, e.g. based on oxides (e.g. cerium oxide, manganese oxide). The temperature is preferably set to above 25° C., particularly to 70° C. to 300° C., and particularly preferably to 140° C. to 160° C. Iron hydroxides and/or iron oxides in solid form are formed during oxidation, as is a Solution III, which is virtually iron-free after separation of the solids. In the framework of the invention, "virtually iron-free" means a total iron content of less than 0.5% by weight.

The iron sulfate monohydrate obtained in accordance with the invention can be used in the known way, e.g. as an additive in the animal feed and fertilizer industry, in water purification, as a reducing agent in general, and particularly for chromate reduction in cement. There is moreover the possibility of further processing into iron oxide pigments, or of producing sulfuric acid by roasting methods.

The iron oxide and/or iron hydroxide produced in accordance with the invention can generally be used in desulfurization processes, as well as for the production of iron oxide pigments or for pig iron production.

EXAMPLES

The method according to the invention is illustrated below on the basis of exemplary mass balances, this not being intended to limit the invention.

Example 1

1,000 kg iron sulfate heptahydrate and 180 kg water are first used to produce a supersaturated, aqueous iron sulfate heptahydrate solution displaying an iron sulfate content of roughly 41% by weight and a calculated iron content of roughly 180 kg (Mixture I). The sulfuric acid concentration is 0.6% by weight.

Mixture I is heated to 65° C. and fed into a heatable pressure vessel. The temperature is increased to 160° C. in the pressure vessel, in which context a pressure of roughly 6 bar develops. During heating, a quantity of roughly 522 kg iron sulfate monohydrate, corresponding to roughly 172 kg iron, is precipitated as a solid in accordance with the solubility curve.

The iron sulfate monohydrate is separated off with adhering mother liquor as a filter cake in a pressure-resistant rotary drum filter under the elevated pressure and temperature conditions. Left in this context is a quantity of roughly 658 kg low-iron solution with an iron content of roughly 8 kg (Solution II). The residual moisture content of the separated iron sulfate monohydrate is in the region of 15% by weight, the trivalent iron content being less than 1.7% by weight.

As a result of the assisted flash evaporation that occurs, the residual moisture content is reduced to 8% by weight when the pressure is subsequently relieved to ambient pressure in a steam-heated mixing screw.

In order to further reduce the iron content of Solution II in a further step, a roughly 36% NaCl solution is added to Solution II. The added quantity of 85 kg NaCl is calculated from the stoichiometrically necessary quantity, referred to the sulfate content in the mother liquor, and is used with an excess of 10%. The NaCl-containing Solution II is subsequently fed into a pressure-resistant, heated oxidation reactor. The iron constituents present in Solution II are oxidized by adding heated air. Under the conditions of roughly 140° C. to 160° C. and roughly 5 to 6 bar, and with a degree of conversion of roughly 80%, iron hydroxide and iron oxide ($Fe_2O_3$) are formed as solids, in a quantity of roughly 10 kg (referred to the iron oxide), corresponding to roughly 6 kg iron.

There remains a quantity of roughly 796 kg wastewater (Solution III) with a quantity of roughly 2 kg dissolved iron, corresponding to an iron content of roughly 0.25% by weight.

The method according to the invention thus makes it possible to convert roughly 96% by weight of the iron from the originally used iron sulfate heptahydrate into iron sulfate monohydrate and, in a special embodiment, to recover roughly a further 3% by weight iron in the form of iron oxide and/or iron hydroxide.

Example 2

If the conditions from Example 1 are modified in that the sulfuric acid concentration in the starting suspension is set to 2.2% by weight, a trivalent iron content in the iron sulfate monohydrate of less than 0.9% by weight is achieved.

Example 3

The conditions from Example 1 are modified in such a way that the filter cake on the rotary drum filter is pressurized with steam, superheated by 15° C. This reduces the residual moisture content of the separated iron sulfate monohydrate before pressure relief to 9% by weight. During subsequent relief of the pressure to ambient pressure in a mixing screw, the residual moisture content is reduced to 4% by weight as a result of flash evaporation.

The above descriptions of certain embodiments are made for the purpose of illustration only and are not intended to be limiting in any manner. Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is being claimed is:

1. A method for processing iron sulfate heptahydrate, comprising:
    a) providing a first mixture comprising an aqueous solution or suspension of iron sulfate heptahydrate;
    b) heating the first mixture in a first pressure vessel to a first temperature that is above the boiling temperature of the first mixture at atmospheric pressure, wherein the first pressure vessel is at a first pressure that corresponds to the first temperature and wherein solid iron sulfate monohydrate and a second solution are formed;
    c) separating the solid iron sulfate monohydrate from the second solution, optionally in a second pressure vessel, at a second temperature and second pressure to form a separated iron sulfate product that comprises solid iron sulfate monohydrate and an adhered portion of the second solution;
    d) feeding the separated iron sulfate product into a third pressure vessel at a third pressure, wherein the temperature of the separated iron sulfate product entering the third pressure vessel is above the boiling temperature of the second solution at the third pressure, wherein the third pressure is lower than then second pressure and wherein during step d) the temperature of the separated iron sulfate product drops to a third temperature that corresponds to the third pressure;
    wherein step d) results in an iron sulfate monohydrate product.

2. The method of claim 1 wherein the first temperature is above 110° C.

3. The method of claim 2 wherein the first temperature is between about 135 and about 300° C.

4. The method of claim 3 wherein the first temperature is between about 140 and about 160° C.

5. The method of claim 1 further comprising introducing a superheated steam or a hot gas having a temperature of at least the first temperature during step c).

6. The method of claim 5 wherein the superheated steam or hot gas is at a temperature that is not more than 100° C. greater than the first temperature.

7. The method of claim 6 wherein the superheated steam or hot gas is at a temperature that is not more than 60° C. greater than the first temperature.

8. The method of claim 7 wherein the superheated steam or hot gas is at a temperature that is not more than 20° C. greater than the first temperature.

9. The method of claim 1 wherein the optional second pressure vessel is used and the second pressure vessel is heatable.

10. The method of claim 1 wherein the third pressure vessel is heatable.

11. The method of claim 1 wherein steps b) and c) occur in the first pressure vessel.

12. The method of claim 1 wherein the second temperature is not less than the first temperature and the second pressure is not less than the first pressure.

13. The method of claim 1 wherein step d) results in an iron sulfate monohydrate product having a residual moisture not greater than 20% by weight, referring to the total mass of the solid.

14. The method of claim 13 wherein the residual moisture content is not greater than 10% by weight.

15. The method of claim 14 wherein the residual moisture content is not greater than 5% by weight.

16. The method of claim 1 wherein step d) results in an iron sulfate monohydrate product having a trivalent iron content no greater than about 10% by weight, referring to total iron.

17. The method of claim 16 wherein the trivalent iron content is not greater than about 3% by weight.

18. The method of claim 17 wherein the trivalent iron content is not greater than about 1% by weight.

19. The method of claim 1 further comprising agglomerating the solid iron sulfate monohydrate resulting from step d).

20. The method of claim 19 further comprising using a binder during agglomeration.

21. The method of claim 1 wherein the second solution formed in step c) is at least partially returned to the first mixture in step a).

22. The method of claim 1 further comprising:
e) feeding the second solution formed in step c) into an oxidation reactor along with air or oxygen and optionally one or more additives;
f) setting the oxidation reactor to a fourth temperature that is above about 25° C. and precipitating iron oxide and/or iron hydroxide to form a third solution that is virtually iron free;
g) separating the iron oxide and/or iron hydroxide from the third solution.

23. The method of claim 22 wherein the fourth temperature is from about 70 to about 300° C.

24. The method of claim 23 wherein the fourth temperature is from about 140 to about 160° C.

25. The method of claim 22 wherein the one or more additives is selected from the group consisting of salts, alkaline substances, oxidation catalysts and mixtures thereof.

26. The method of claim 22 wherein the oxidation reactor is pressure-resistant and optionally heatable.

27. The method of claim 1 further comprising:
introducing steam, having a temperature of at least but not more than 100° greater than the first temperature, during step c);
wherein the first temperature is above 110° C.; and
wherein the second temperature is not less than the first temperature and the second pressure is not less than the first pressure.

28. The method of claim 27 wherein:
the first temperature is between about 135 and about 300° C.; and
the steam is at a temperature that is not more than 60° C. greater than the first temperature.

29. The method of claim 28 wherein:
the first temperature is between about 140 and about 160° C.; and
the steam is at a temperature that is not more than 20° C. greater than the first temperature.

\* \* \* \* \*